(12) United States Patent
Mori

(10) Patent No.: US 7,710,533 B2
(45) Date of Patent: May 4, 2010

(54) METHOD OF MANUFACTURING LIQUID CRYSTAL DISPLAY PANEL AND APPARATUS FOR CUTTING LIQUID CRYSTAL DISPLAY PANEL

(75) Inventor: Makoto Mori, Kanagawa (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 324 days.

(21) Appl. No.: 11/606,956

(22) Filed: Dec. 1, 2006

(65) Prior Publication Data

US 2007/0132935 A1 Jun. 14, 2007

(30) Foreign Application Priority Data

Dec. 8, 2005 (JP) .............................. 2005-354748

(51) Int. Cl.
*G02F 1/13* (2006.01)
*G02F 1/1333* (2006.01)
*B26F 3/00* (2006.01)

(52) U.S. Cl. .............................. 349/187; 349/158; 225/2

(58) Field of Classification Search ................. 349/158, 349/187, 190; 225/2, 96.5
See application file for complete search history.

(56) References Cited

U.S. PATENT DOCUMENTS

| 6,741,320 | B2 * | 5/2004 | Chae et al. ................. 349/187 |
| 6,747,725 | B2 * | 6/2004 | Chae et al. ................. 349/158 |
| 6,774,978 | B2 * | 8/2004 | Shin ........................... 349/187 |
| 6,795,154 | B2 * | 9/2004 | Uh et al. ..................... 349/158 |
| 6,864,947 | B2 * | 3/2005 | Shiraishi ..................... 349/158 |
| 7,079,216 | B2 * | 7/2006 | Yamazaki et al. ........... 349/158 |
| 7,265,805 | B2 * | 9/2007 | Jung ........................... 349/153 |
| 7,426,883 | B2 * | 9/2008 | Nishio et al. .................. 83/435 |
| 7,528,341 | B2 * | 5/2009 | Kim ....................... 219/121.67 |
| 2004/0040997 | A1 * | 3/2004 | Ueyama et al. ............. 225/96.5 |
| 2005/0118921 | A1 | 6/2005 | Jung |

FOREIGN PATENT DOCUMENTS

| CN | 1621895 | 6/2005 |
| CN | 100359370 | 1/2008 |
| JP | 10-170880 | 6/1998 |
| JP | 2002-37638 | 2/2002 |
| JP | 2003-286044 | 10/2003 |
| JP | 2004-244229 | 9/2004 |

OTHER PUBLICATIONS

Chinese Patent Office issued a Chinese Office Action dated Mar. 20, 2009, Application No. 200610153173.2.

* cited by examiner

*Primary Examiner*—Uyen-Chau N Le
*Assistant Examiner*—John M Bedtelyon
(74) *Attorney, Agent, or Firm*—Young & Thompson

(57) ABSTRACT

A liquid crystal display (LCD) panel is fixed to a supporting stage by vacuum holding in a way that an end portion of a predetermined one of edges of the pair of substrates protrudes from the supporting stage. Next, scribe lines are formed respectively in positions on upper and lower surfaces of the end portion of the pair of substrates, and the end portion protruding from the supporting stage. Thereafter, a load is applied to a predetermined position by using a break pin. The load is applied to the predetermined position at a side of the scribe lines toward the outside closer to starting points of the respective scribe lines. Accordingly, the LCD panel is cut.

9 Claims, 8 Drawing Sheets

METHOD OF MANUFACTURING LIQUID CRYSTAL DISPLAY PANEL AND APPARATUS FOR CUTTING LIQUID CRYSTAL DISPLAY PANEL

BACKGROUND OF THE INVENTION

1. Field of the Invention

The present invention relates to a method of manufacturing a liquid crystal display (LCD) panel, and an apparatus for cutting the LCD panel. Particularly, the present invention relates to a method of cutting a pair of substrates bonded to each other, and to an apparatus for cutting the pair of substrates.

2. Description of the Related Art

LCD devices are utilized in a wide range of fields, including Office Automation (OA) equipment, Audio and Visual (AV) equipment and portable terminal equipment, owing to characteristics thereof of thin profile, light weight, and low power consumption. These LCD devices are each composed of an LCD panel including a pair of glass substrates holding liquid crystal material interposed therebetween; a backlight for lighting the LCD panel; and the like. In order to reduce manufacturing cost of the LCD panel, the LCD panel is manufactured in the following manner. Each of the substrates is prepared by using a glass substrate of a large size. The two substrates are then bonded to each other by using a sealing material and the like. Thereafter, a pair of substrates, which have been bonded to each other, is cut into predetermined dimensions with a cutting apparatus.

A standard method of cutting the pair of substrates is as follows. First of all, an entire surface of the LCD panel is fixed to a stage by vacuum holding. A cutter for scribing the LCD panel is brought down from above onto the LCD panel, followed by moving the cutter along one of the substrates with a predetermined pressure applied to the cutter. A first notch cut having a predetermined depth is formed in the substrate of the LCD panel by the cutter. Next, LCD panel is turned upside down, followed by fixing the LCD panel onto the stage by vacuum holding. Thereafter, by use of a break bar, one side of the LCD panel is cut by applying a vertical load on the LCD panel from above. Next, the surface, which has not been cut, is faced up, and an entire surface of the LCD panel is fixed to the stage by vacuum holding. After the second notch cut is formed in a similar manner, the surface, which has this notch cut formed thereon, is faced down, and an entire surface of the LCD panel is fixed to the stage by vacuum holding. Then, the other side of the LCD panel is cut by applying a vertical load, with the break bar, to the LCD panel from above. Thereby, the LCD panel is cut into two pieces.

However, when the cutting is performed with the above-described method of the related art, there arises a problem that, at the time of the second cutting, cut portions of the initially-cut substrate of the LCD panel grind against each other, and thereby chipping occurs thereon. A reason for this is as follows. At the time of the second cutting, while a substrate on a surface of the stage receives a tensile stress, the initially-cut glass substrate of the LCD panel receives a compressive stress, and then is released from the compressive stress. As a result, the movements of contraction and release lead to the grinding of the cut portions of the substrate of the LCD panel.

When the substrate is chipped, chipped flakes intrude into the gaps between the pair of substrates, between each of the pair of substrates and a polarizing plate, and the like. As a result, display quality of the LCD panel is degraded, and it results in a decreased yield of the LCD panels.

SUMMARY OF THE INVENTION

Consequently, an exemplary feature of the invention is to provide a method of cutting a pair of substrates and an apparatus for cutting a pair of substrates. The method and the apparatus make it possible to suppress incidence of chipping on the substrate, and to increase a yield of a panel.

The method of cutting a pair of substrates of the present invention includes a step of fixing a pair of substrates, which have been bonded to each other, to a supporting stage so that an end portion of a predetermined one of edges of the pair of substrates protrudes from the supporting stage; a step of forming scribe lines respectively in positions on upper and lower surfaces of the end portion of the pair of substrates, the positions opposite to each other, and the end portion protruding from the supporting stage; and a step of applying a load to a predetermined position of one of the substrates, and advancing the scribe lines. The predetermined position is at the side of the scribe lines, and is closer to starting points of the respective scribe lines, the side being closer to the predetermined edge of the pair of substrates.

Preferably, the load applied to the substrates is applied from a direction substantially perpendicular to the substrates.

Preferably, the load applied to the substrates is applied from a direction oblique to a line substantially perpendicular to the substrates.

Preferably, the load applied to the substrates is applied from a direction oblique to a direction toward the predetermined edge, and to a direction in which the scribe lines extend.

Preferably, the pair of substrates is a liquid crystal display panel.

Preferably, the shortest distance between the scribe lines and the predetermined position is approximately 5 mm to 15 mm.

Preferably, the shortest distance between an edge at the side of the starting points of the respective scribe lines on the pair of substrates and the predetermined position is approximately 30 mm or shorter.

Preferably, the load applied to the substrates is applied by use of a break pin made of a nonmetallic material.

The apparatus for cutting a pair of substrates of the invention includes a supporting stage, a pair of scribe cutters and a break pin. The supporting stage onto which the pair of substrates bonded to each other is fixed so that an end portion of a predetermined one of edges of the pair of substrates protrudes from the supporting stage. The pair of scribe cutters is for forming scribe lines, on the pair of substrates fixed to the supporting stage, along a border sections each between panels in positions respectively on upper and lower surfaces of the end portion of the pair of substrates. The positions correspond to each other, and the end portion protruding from the supporting stage. The break pin is arranged in a predetermined portion outside a plane of the supporting stage, and cuts the pair of substrate into the panels along the scribe lines by applying a load to a predetermined position of one of substrates. The predetermined position is at a side of the scribe lines, and is closer to starting points of the respective scribe lines, the side of the scribe lines being closer to the predetermined edge of the pair of substrates.

Preferably, the load applied to the substrates is applied with the above break pin from a direction substantially perpendicular to the substrates.

Preferably, the load applied to the substrates is applied with the above break pin from a direction oblique to a line substantially perpendicular to the substrates.

Preferably, the load applied to the substrates is applied with the above break pin from a direction oblique to a direction toward the predetermined edge, and to a direction in which the scribe lines extend.

Preferably, the panel is a liquid crystal display panel.

Preferably, the shortest distance between the scribe lines and the predetermined position is approximately 5 mm to 15 mm.

Preferably, the shortest distance between an edge at the side of the starting points of the respective scribe lines on the pair of substrates and the predetermined position is approximately 30 mm or shorter.

Preferably, the load applied to the substrates is applied by use of the break pin made of a nonmetallic material.

In the present invention, a liquid crystal display panel is cut in the following manner. Scribe lines are formed respectively in positions on upper and lower surfaces of the end portion of the pair of substrates. The positions correspond to each other, and the end portion protruding from the supporting stage. The liquid crystal display panel is cut by use of the principle of "leverage" and a self weight of the liquid crystal display panel. Specifically, a load is applied from a vertical or oblique direction to a predetermined position. The predetermined position is at the side of the scribe lines, and is closer to starting points of the respective scribe lines, the side being closer to the predetermined edge of the pair of substrates. Because the load applied to the liquid crystal display panel can be thereby made small, chipping due to mutual grinding of cut portions of one of glass substrates of the liquid crystal display panel can be suppressed. Thereby, a yield of the liquid crystal display panel can be increased.

According to the method of manufacturing a liquid crystal display panel of the present invention, chipping due to mutual grinding of cut portions of the substrate of the liquid crystal display panel can be suppressed. Thereby, a yield of the liquid crystal display panel can be increased. A reason for this is as follows. When the pair of substrates of the liquid crystal display panel is cut, the pair of substrates is fixed to the supporting stage by vacuum holding in a state of overhanging the supporting stage (a state where one of end portions of the pair of substrates protruding from the supporting stage). Then, scribe lines are formed respectively on both of upper and lower substrates of the liquid crystal display panel by scribing, from upper and lower directions, positions where the pair of substrates overhangs. Thereafter, a load is applied to a predetermined position from a vertical or an oblique direction. The predetermined position is at a side of the scribed lines, and is closer to starting points of the respective scribe lines, the side being closer to the predetermined edge of the pair of substrates. Accordingly, the load applied to the liquid crystal display panel can be made small.

According to the apparatus for cutting a liquid crystal display panel of the present invention, chipping due to mutual grinding of cut portions of one of glass substrates of the liquid crystal display panel can be suppressed. Thereby, a yield of the liquid crystal display panels can be increased. A reason for this is as follows. When a pair of substrates of the liquid crystal display panel is cut, the pair of substrates is fixed to a supporting stage in vacuum holding in a state of overhanging the supporting stage (a state where one of end portions of the pair of substrates protruding from the supporting stage). Then, scribe lines are formed respectively on both of upper and lower substrates of the liquid crystal display panel by scribing, from upper and lower directions, positions where the pair of substrates overhangs. Thereafter, with a break pin, a load is applied to a predetermined position from a vertical or an oblique direction. The predetermined position is at a side of the scribe lines, and is closer to starting points of the respective scribe lines, the side being closer to the predetermined edge of the pair of substrates. Accordingly, the load applied to the liquid crystal display panel can be made small.

BRIEF DESCRIPTION OF THE DRAWINGS

These and other objects and advantages and further description of the invention will be more apparent to those skilled in the air by reference to the description, taken in connection with the accompanying drawings, in which.

DETAILED DESCRIPTION OF THE PREFERRED EMBODIMENTS

Figure 1A:
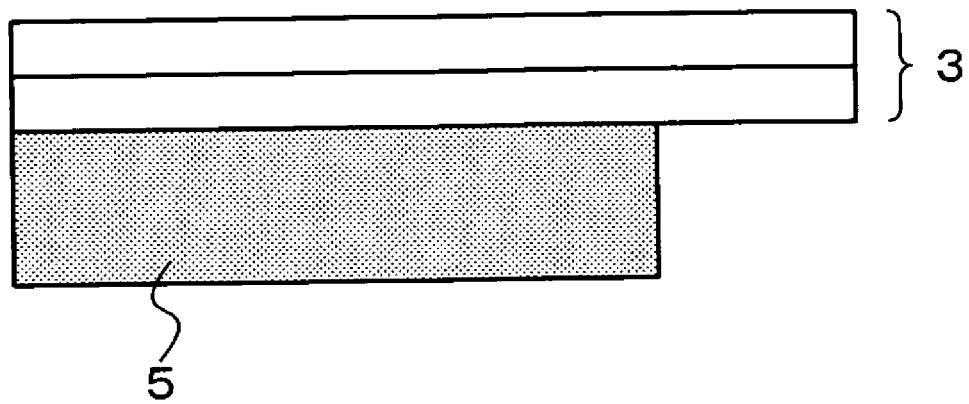
FIGS. 1A to 1C are respectively front views, which follow a sequence of processes, for explaining a cutting method according to a first exemplary embodiment of the invention.

Before explaining preferred embodiments of the present invention, the method for cutting an LCD panel according to the related arts will be specifically described. First, an entire surface of the LCD panel is fixed onto a stage by vacuum holding. A cutter for scribing the LCD panel is brought down from above onto the LCD panel, followed by moving the cutter along one of the substrates with a predetermined pressure applied to the cutter. A first scribe line having a predetermined depth is formed in a first substrate of the LCD panel by the cutter. Subsequently, the surface of the first substrate is faced down, and the entire surface of the LCD panel is fixed to the stage by vacuum holding. Thereafter, by use of a break bar, the first substrate is cut by applying a vertical load to the LCD panel from above. Next, a surface of a second substrate is faced up, and an entire surface of the LCD panel is fixed to the stage by vacuum holding. After a second scribe line is formed in a similar manner in the second substrate, the surface of the second substrate is faced down. That is, the surface, on which the first scribe line has been formed, is faced up. Then, an entire surface of the LCD panel is fixed to the stage by vacuum holding. After that, the second substrate of the LCD panel is cut by applying a vertical load, with the break bar, to the LCD panel from above. Thereby, the LCD panel is cut into two pieces.

In a case where one substrate of the LCD panel is scribed and cut by adding an impact with the break bar, a standard process is that, in order to cause that a scribe crack advance vertically, a vertical load is applied from directly above the scribe line. At this time, because the vertical load is applied to the same position as that of a corresponding one of the scribe lines, the cutting is stably performed in a vertical direction.

As a first related art, proposed in Japanese Patent Application Laid-Open No. 2002-37638 is as follows. A pair of column-shaped impact protrusions is attached to one of extremities of the break bar. Thereby, the cutting is performed not by directly applying the vertical load to a scribe line, but by applying loads respectively at two points between which the scribe line extends. In this related art, the LCD panel is first fixed onto the stage, and a scribe line is formed on one of the substrates of the LCD panel by means of the cutter. An upper glass substrate in this state is the one of the substrates. Next, the LCD panel is turned upside down, and then is fixed onto the stage. Thereafter, certain loads are applied respectively to the two points between which the scribe line extends, by using the break bar to one of the extremities of which the pair of column-shaped impact protrusions is attached. Accordingly, a cut for the scribe line is made, and thereby one of the substrates of the LCD panel is cut. Then, another scribe line is formed on the other one of the substrates of the LCD panel in the same manner as that described above, and the LCD panel is turned upside down. Then, the LCD panel is fixed onto the supporting stage, and certain loads are applied respectively to the two points between which the scribe line extends, by using the break bar to one of the extremities of which the pair of column-shaped impact protrusions is attached. Hence, a cut for the scribe line is made, and thereby the other one of the substrates of the LCD panel is cut.

As has been described above, one side of the LCD panel is scribed and cut. Then, the pair of column-shaped impact protrusions is attached to one of the extremities of the break bar, and loads are applied respectively to two points between which the scribe line extends, instead of directly applying the vertical load to a scribe line. Thereby, the cutting is stably performed in a vertical direction because the loads can be dispersed on a glass of the LCD panel through point contact.

Figure 7:
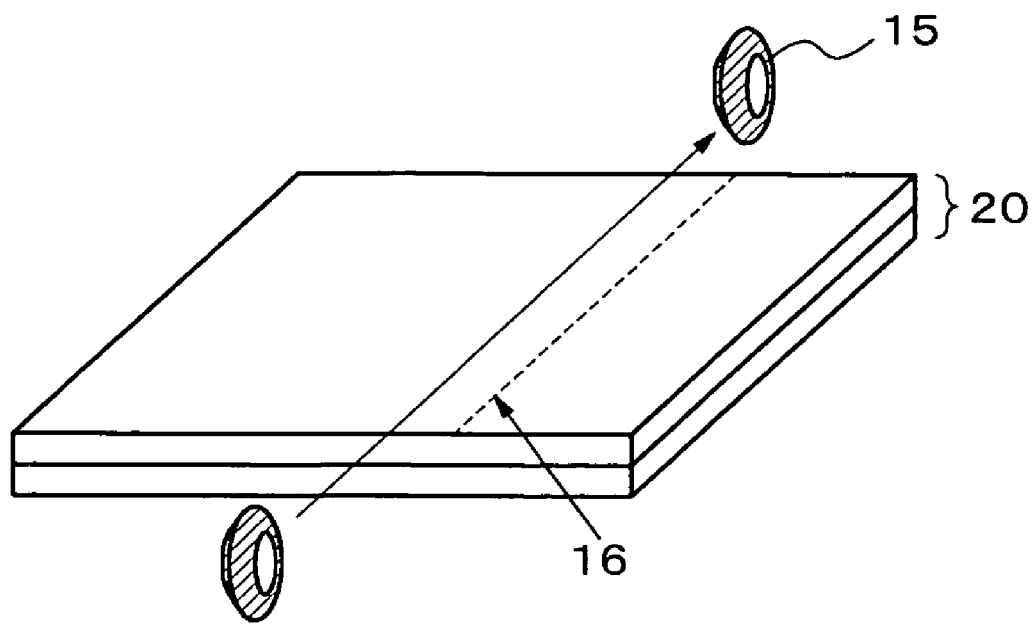
FIG. 7 is a perspective view showing a cutting apparatus of a second related art.
Figure 8:
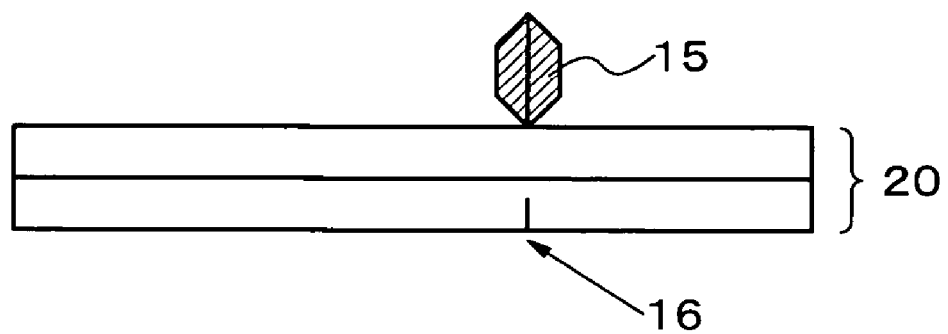
FIG. 8 is a front view showing the cutting apparatus of the second related art.

As a second related art, proposed in Japanese Patent Application Laid-Open No. 2004-244229 is as follows. The LCD panel is cut by plunging a break wheel from directly above a scribe line, and by moving the break wheel along the scribe line. In this related art, an LCD panel 20 is fixed onto an unillustrated stage, and a scribe line 16 is formed on one (an upper glass substrate in this state) of substrates of the LCD panel 20 by means of a cutter, as shown in FIGS. 7 and 8. Next, the LCD panel 20 is turned upside down, and then is fixed onto the stage. Then, a cut for the scribe line 16 is made by moving the break wheel 15 on the scribe line 16 while rotating the break wheel 15 with a load applied thereto, so that one of the substrates of the LCD panel 20 is cut. Then, another scribe line 16 is formed on the other one of the substrates of the LCD panel 20 in the same manner as that described above, the LCD panel 20 is turned upside down, and then is fixed onto the stage. After that, a cut for the scribe line 16 is made by moving the break wheel 15 on the scribe line 16 while rotating the break wheel 15 with a load applied thereto, so that the other one of the substrates of the LCD panel 20 is cut.

As has been described above, one side of the LCD panel 20 is scribed and cut. Then, the break wheel 15 is plunged from directly above the scribe line 16, and is moved along the scribe line 16. Thereby, flaws on glass surfaces of the LCD panel 20 are reduced because a vertical load can be dispersed and then applied.

Figure 9:
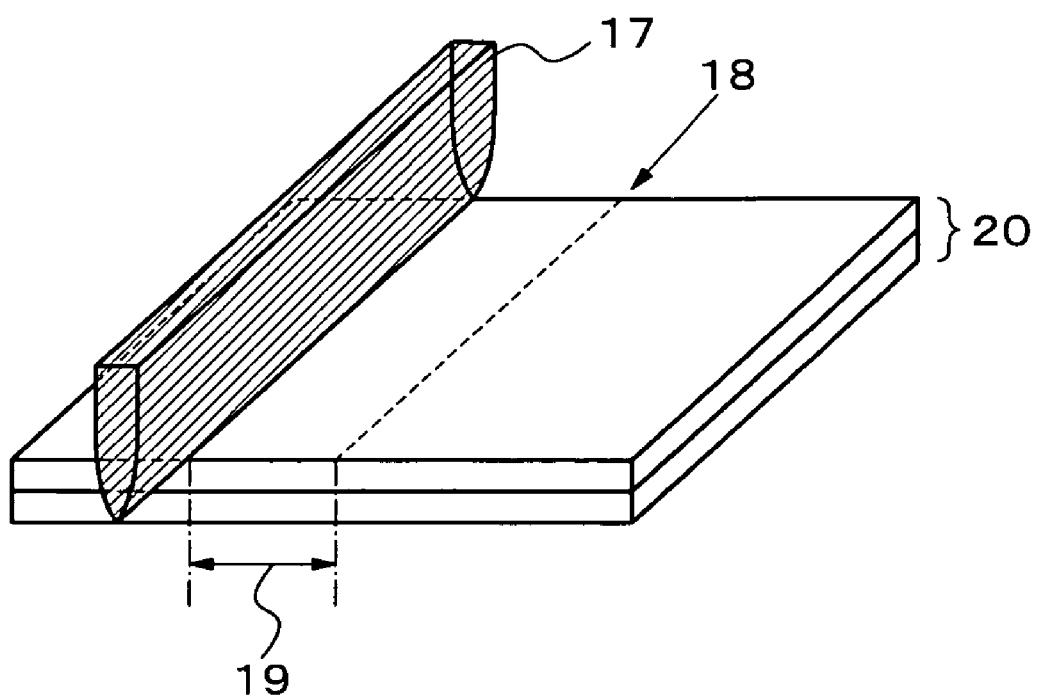
FIG. 9 is a perspective view showing a cutting apparatus of a third related art.

As a third related art, proposed in Japanese Patent Application Laid-Open No. Hei 10-170880 is as follows. An LCD panel is cut by applying a vertical load, by means of a break bar, to a position shifted by a predetermined distance from a position directly above a scribe line. In this related art, an LCD panel 20 is first fixed onto an unillustrated stage, and a scribe line 18 is formed on one (an upper glass substrate in this state) of substrates of the LCD panel 20 by means of a cutter, as shown in FIG. 9. Next, the LCD panel 20 is turned upside down, and then is fixed onto the stage. Thereafter, by means of a break bar 17, a vertical load is applied to the entire scribe line 18 in a position shifted by a predetermined distance 19 in FIG. 9 from a position directly above the scribe line 18. The predetermined distance is not more than 1.5 times as long as a length of a plate thickness of a glass substrate of the LCD panel 20 (not more than about 2 mm). Thereby, a cut for the scribe line 18 is made, so that one of the substrates of the LCD panel 20 is cut. Then, another scribe line 18 is formed on the other one of the substrates of the LCD panel 20 in the same manner as that described above, and the LCD panel 20 is turned upside down, and then is fixed onto the stage. Thereafter, by means of the break bar 17, a vertical load is applied to the entire scribe line 18 in a position shifted by the predetermined distance from a position directly above the scribe line 18. Thereby, a cut for the scribe line 18 is made, so that the other one of the substrates of the LCD panel 20 is cut.

As has been described above, one side of the LCD panel 20 is scribed and cut. Then, instantaneous distortion occurs while a vertical load is applied, by means of the break bar 17, to a position shifted by the predetermined distance from a position directly above the scribe line 18. Thereby, application of the vertical load is reduced, and generation of static electricity at the time of the cutting is reduced.

However, in a case where the cutting is performed by any one of the above-described methods of the respective related arts, there arises a problem that, at the time of the second cutting, cut portions of an initially-cut one of substrates of an LCD panel grind against each other. Thereby, chipping occurs thereon. A reason for this is as follows. At the time of the second cutting, while a substrate on a surface of the stage receives a tensile stress, the initially-cut glass substrate of the LCD panel receives a compressive stress, and then is released from the compressive stress. As a result, the movements of contraction and release lead to the grinding of the cut portions of the substrate of the LCD panel.

Similarly, with any one of the cutting methods respectively of the first to third related arts, there arises a problem that, at the time of the second cutting, while a substrate on a surface of the stage receives a tensile stress, the initially-cut glass substrate of the LCD panel receives a compressive stress, and then is released from the compressive stress. As a result, the movements of contraction and release lead to the grinding of the cut portions of the substrate of the LCD panel.

When the substrate is chipped, chipped glass flakes intrude in between the pair of substrates, in between each of the pair of substrates and a polarizing plate, and the like. For this reason, display quality of the LCD panel is degraded, and it results in a decreased yield of the LCD panels.

Next, preferred embodiments of the present invention will be described in detail with reference to the drawings. According to one preferred embodiment of the present invention, a method of manufacturing an LCD panel, which includes a step of cutting a pair of substrates bonded to each other, at least includes a first step of causing the pair of substrates to be fixed to a supporting stage by vacuum holding so that an end portion of a predetermined one of edges of the pair of substrates protrudes from the supporting stage; a second step of forming scribe lines respectively in positions on upper and lower surfaces of the end portion of the pair of substrates, the positions correspond to each other, and the end portion protruding from the supporting stage; and a third step of applying a load to a predetermined position of one of the substrates by using a rod-shaped or roller-shaped break pin at least an extremity of which is made of, or coated with, a nonmetallic material. The position is at the side of the scribe lines, and is closer to starting points of the respective scribe lines. The load is applied from any one of a direction substantially perpendicular to the substrates, and a direction which is oblique to a direction toward the predetermined edge, and in which the scribe lines extend. Because a load applied to the LCD panel can be there by made small, chipping due to mutual grinding of cut portions of a glass substrate of the LCD panel can be suppressed. Thereby, a yield of the LCD panels can be increased.

First Embodiment

With reference to FIGS. 1A to 4, descriptions will be provided for a method of manufacturing an LCD panel and an apparatus for cutting an LCD panel according to a first exemplary embodiment of the present invention.

An LCD panel to be cut with the method of the present invention is composed of an active-matrix substrate on which switching elements, such as thin-film transistors (TFTs), are formed; a counter substrate facing the active-matrix substrate; and a liquid crystal layer interposed and held between the two substrates. In order to reduce manufacturing costs of the LCD panels, a commonly-used method is that, after each of the active-matrix and counter substrates has been prepared by using a glass substrate of a large size, the two substrates are bonded to each other by using a sealing material and the like. Then, the pair of substrates bonded to each other is cut into predetermined dimensions in accordance with a size of a product to be manufactured. Then, an LCD device is manufactured with an individual LCD panel obtained by the cutting, a backlight, and the like.

Hereinbelow, a method of, and an apparatus for, cutting a pair of glass substrates composing the LCD panel in the first embodiment will be described with reference to FIGS. 1A to 1C and FIG. 2.

The apparatus for cutting the LCD panel in the first embodiment includes a supporting stage 5, a pair of scribe cutters 14 and a break pin 1. The LCD panel is fixed to the supporting stage 5 by vacuum holding. The scribe cutters 14, as a pair, are respectively arranged in predetermined positions outside a plane of the supporting stage 5. The break pin 1 is arranged in a predetermined position outside the plane of the supporting stage 5.

As shown in FIGS. 1A to 1C and FIG. 2, the LCD panel 3 is fixed to the supporting stage 5 by vacuum holding in a state where an end portion of a predetermined one of the edges of the LCD panel 3 protrudes from the supporting stage 5 to the extent that the LCD panel 3 itself does not bend. That is, the LCD panel 3 is fixed by vacuum holding in a state where the LCD panel 3 overhangs the supporting stage 5 to the extent that the LCD panel 3 itself does not bend.

The pair of scribe cutters 14 is formed of a super hard material such as diamond or sapphire. On the LCD panel 3 fixed onto the supporting stage 5, scribe lines 2 (the broken line in FIG. 2) are formed respectively in positions on upper and lower surfaces of the end portion protruding from the supporting stage 5 by using the pair of scribe cutters 14 both from above and below. These scribe lines 2 are each formed along a corresponding one of previously determined boundary sections between individual LCD panels into which the LCD panel 3 is cut.

With the break pin 1, a vertical load is applied to the LCD panel 3, on which the scribe lines 2 have been formed, in a predetermined position outside the scribe lines 2 having been formed. Thereby, the entire LCD panel 3 is cut along the scribe lines 2. It is preferable that the break pin 1 be formed of such a material that flaws and damages are not caused on glasses of the LCD panel 3, and that generation of static electricity can be suppressed. In addition, it is preferable that at least an extremity of the break pin 1 be formed of a nonmetallic material such as polyurethane resin or hard rubber. Otherwise, instead of having the break pin 1 itself formed of the nonmetallic material, a surface of the break pin 1 formed of a metallic material may be coated with a nonmetallic material such as resin. A shape and dimensions of the break pin 1 are not limited to the descriptions in the drawings. For example, a diameter thereof may be made large or small.

Next, the method of cutting the LCD panel will be described. First, as shown in FIG. 1A, the LCD panel 3 is fixed to the supporting stage 5. At this time, in the first embodiment, the entire LCD panel 3 is not arranged within the area of the supporting stage 5, but is arranged in a state of protruding from (overhanging) the supporting stage 5 to the extent that the LCD panel 3 itself does not bend. Then, the LCD panel 3 is fixed onto the supporting stage 5 by vacuum holding in a state where the LCD panel 3 overhangs the supporting stage 5. When an amount of this overhang is large, the LCD panel 3 bends downward because of a self weight thereof, and a scribe crack is not substantially perpendicularly penetrated, but is obliquely penetrated. For this reason, the LCD panel 3 needs to be overhung by a distance which keeps the LCD panel 3 itself from bending. Meanwhile, it has been confirmed that, when the amount of the overhang is not more than about 50 mm, the bending of the LCD panel 3 can be suppressed to a level causing no problem.

Figure 1B:
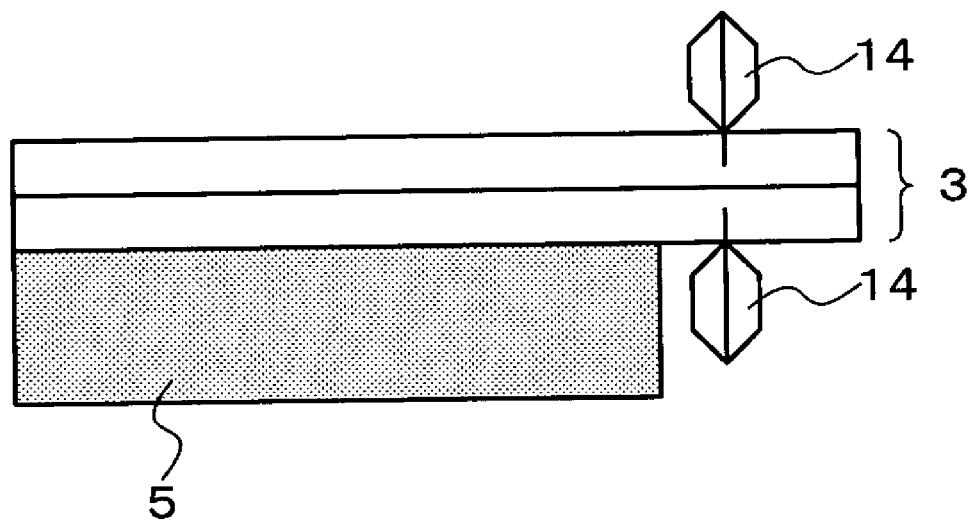

Subsequently, notch lines (scribe lines) are formed on the LCD panel 3. At this time, in the first embodiment, the scribe lines 2 (the broken line in FIG. 2) are formed, as shown in FIG. 1B, respectively in positions on upper and lower surfaces of the end portion of the LCD panel 3, the positions opposite to each other, and the end portion protruding from the supporting stage 5. The scribe lines 2 are formed along the boundary sections by use of the pair of scribe cutters 14 not only from above but both from above and below the LCD panel 3. At this time, it is desirable that each of depths of cuts along the respective scribe lines 2 be about 70 to 90% of each of glass plate thicknesses of a corresponding one of substrates of the LCD panel 3. A reason for this is as follows. When the cuts are not more than 70% of the respective glass plate thicknesses, there may be a case where the cutting fails at the time of breaking. Moreover, when the cuts are not less than 90% of the respective glass plate thicknesses, the LCD panel 3 is cut because of the self weight thereof. However, the LCD panel 3 is cut in various places, and some of uncuttable portions remain as protrusions.

Figure 1C:
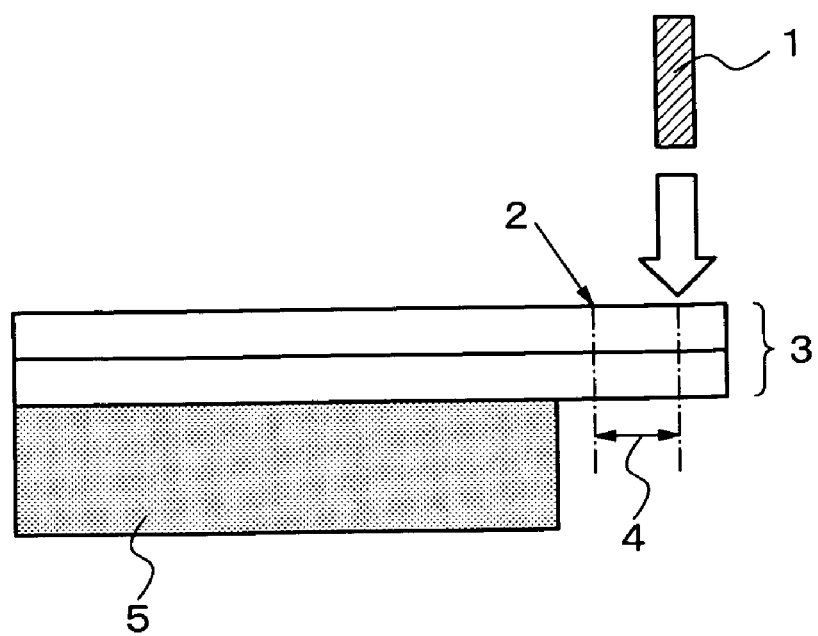
Figure 2:
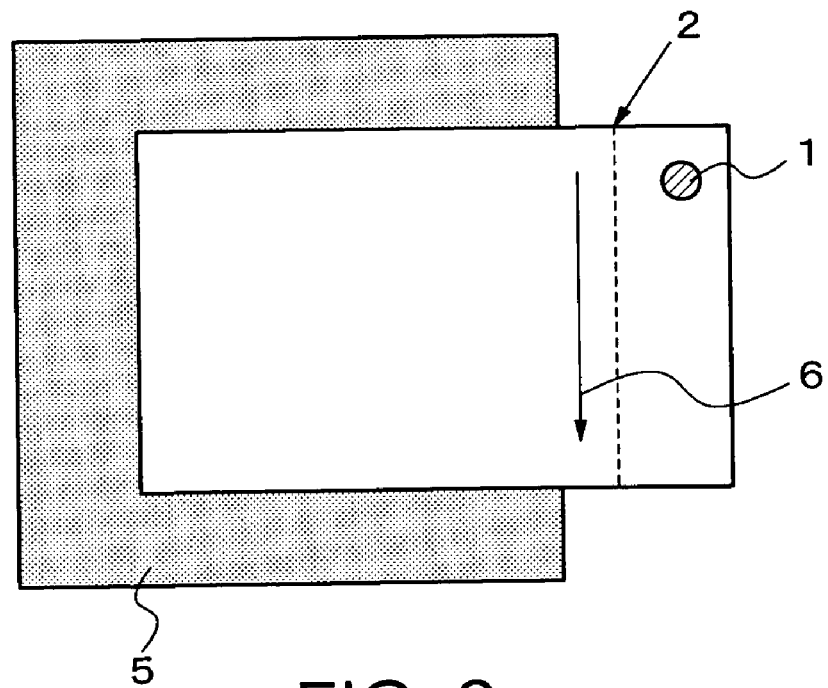
FIG. 2 is a top view schematically showing a cutting apparatus according to the first embodiment of the invention.

Next, as shown in FIG. 1C, the break pin 1 is placed in a predetermined position at a side of the scribe lines 2 toward the outside, the scribe lines 2 being formed on the LCD panel 3. When the break pin 1 is brought down in a direction indicated by the arrow in FIG. 1C, and then when a vertical load is applied to the LCD panel 3 with the break pin 1, a vicinity of a place in the LCD panel 3 (a position of starting points of the respective scribe lines 2) to which the vertical load is applied is prepared to be cut and to fall. Then, a cut section of the LCD panel 3 is gradually made toward an inside of the LCD panel 3 with the self weight of the LCD panel 3 being added to the cut section. Thereby, the entire LCD panel 3 is cut.

Figure 4A:
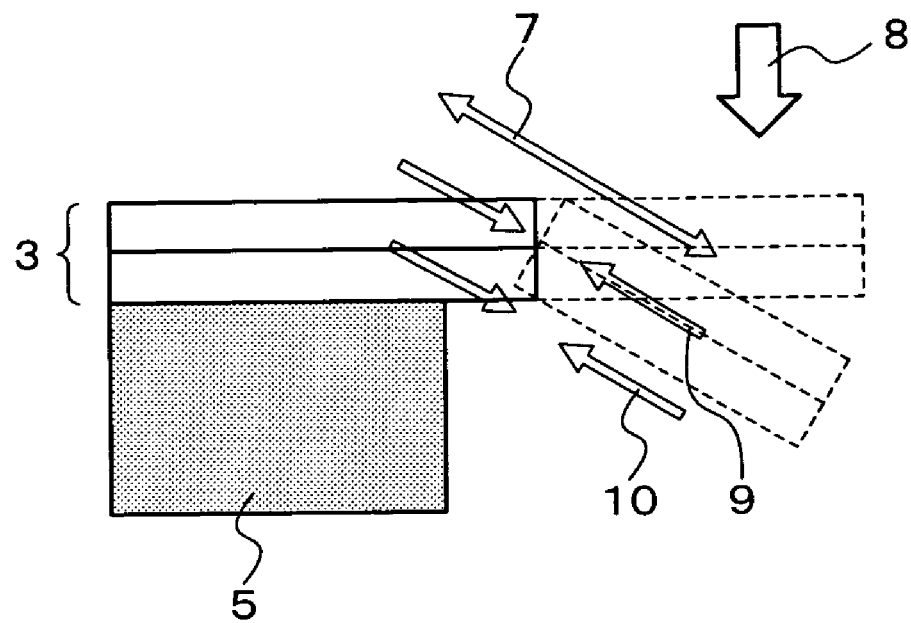
FIG. 4A is an explanatory view of a cut state showing a principal of cutting an upper glass substrate according to the cutting method according to the first embodiment of the invention.

The manner in which this cutting is performed will be specifically described with reference to FIGS. 4A and 4B. First, when the scribe lines 2 are formed respectively from both upper and lower surfaces of the LCD panel 3 by using the scribe cutters 14, and when the depths of the cuts are set at about 70% to 90% of glass plate thicknesses of the respective substrates of the LCD panel 3, both of the upper and lower glass substrates of the LCD panel 3 are nearly cut at this point. Next, as shown in FIG. 4A, when an impact (a vertical load 8 as illustrated) from above the LCD panel 3 is applied to a predetermined position at a side of the scribe lines 2 toward the outside, each of the glass substrates of the LCD panel 3 bends downward because the supporting stage 5 is not present below the position of the LCD panel 3 to which the vertical load 8 is applied. Thereby, a tensile stress 7 and a compressive stress 9 respectively work on a surface of the upper glass substrate facing up, and on a surface thereof facing inward, and the cut of the scribe line 2 on the upper glass substrate receives the tensile stress 7. Accordingly, the size of the cut is made larger, and the upper glass substrate of the LCD panel 3 is cut.

Figure 4B:
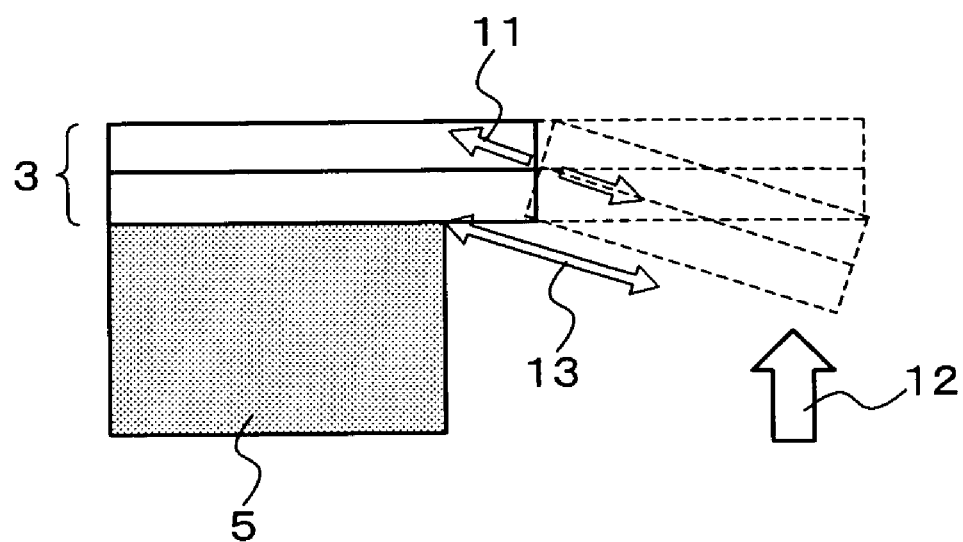
FIG. 4B is an explanatory view of a cut state showing a principal of cutting a lower glass substrate according to the cutting method according to the first embodiment of the invention.

Thereafter, a compressive stress 10 generated in the lower surface portion of the upper glass substrate of the LCD panel 3 which has been cut is released, and a tensile stress 13 occurs in the lower glass substrate of the LCD panel 3, as shown in FIG. 4B. Hence, the size of a cut of the scribe line 2 on the lower glass substrate of the LCD panel 3 is made larger, and the lower glass substrate of the LCD panel 3 is cut. The vicinity of the place in the LCD panel 3 to which the vertical load is applied is prepared to be cut and to fall, and thus the self weight of the LCD panel 3 is added thereon. Then, the LCD panel 3 is gradually cut from an end portion of the LCD panel 3 toward a central portion thereof.

In this event, in consideration of a position to which the vertical load is applied with the break pin 1, when the scribe lines 2 which is to be actually cut, and the position to which the vertical load is applied, are distant from each other, it means that a point of action and a point of lever are distant from each other. Here, a fulcrum is located approximately at the same location as that of the point of lever. When the point of action and the point of lever are distant from each other, a large force is applied to the point of lever with a small force applied at the point of action. Accordingly, the amount of the vertical load is smaller when the vertical load is applied at a point distant from the scribe lines 2, as compared to a case where the vertical load is applied from above the scribe lines 2.

However, when a distance between each of the scribe lines 2 and the position to which the vertical load is applied is made longer, the glass substrates of the LCD panel 3 bend. For this reason, a direction in which an impact stress is applied is oblique, and the stress is dispersed laterally. As a result, it is difficult to cut the LCD panel 3 unless the impact stress is made larger. When the impact stress is made larger to accommodate this, mutual grinding of glass pieces of the LCD panel 3 is more considerable. Thereby, chipping occurs thereon. On the other hand, when the above distance is made smaller, the principal of "leverage" does not work between the cutting section and the position to which the vertical load is applied. As a result, it is difficult to cut the LCD panel 3 unless the vertical load is made larger. When the vertical load is made larger to accommodate this, mutual grinding of glass pieces of the LCD panel 3 is more considerable. Thereby, chipping occurs thereon. Accordingly, in order to cause a vertical load to appropriately work on the glass substrates of the LCD panel 3, it is necessary to specify the position to which the vertical load is applied.

Figure 3:
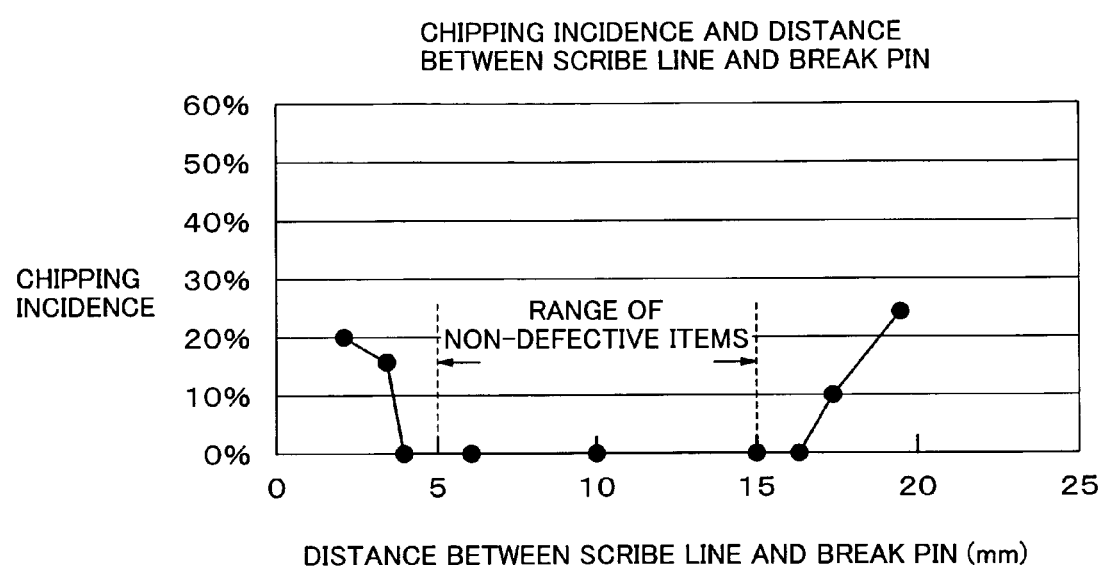
FIG. 3 is a graph showing a correlation between an incidence of chipping and a distance from scribe lines to a position to which a load is applied with a break pin, in the cutting method according to the first embodiment of the invention.

Consequently, for the purpose of specifying the position in which a vertical load can be caused to appropriately work on the glass substrates of the LCD panel 3, and in which the LCD panel 3 can be reliably cut, the various shortest distance between each of the scribe lines 2 and the position to which the vertical load is applied with the break pin 1, was varied, and chipping incidences were examined for cases with the respective distances. That is, a length of a line extended from a central position of the break pin 1 in a direction substantially perpendicular to the scribe lines 2 was varied, and chipping incidences were examined for cases with the respective lengths. The results thereof are shown in FIG. 3. As shown in FIG. 3, it was made clear that the shortest distance, with which chipping does not occur, between each of the scribe lines 2 to the position to which the vertical load is applied with the break pin 1 is in a range of about 5 mm to 15 mm. Additionally, the same experiment was carried out for the shortest distance between one of edges of the LCD panel 3 at a side of the starting points of the respective scribe lines 2, and the position to which the vertical load is applied with the break pin 1. That is, the same experiment was carried out for a length of a line extended from the central position of the break pin 1 in a direction substantially perpendicular to the above-mentioned edge. As a result, it was made clear that the shortest distance between one of edges of the LCD panel 3 at a side of the starting points of the respective scribe lines 2, and the position to which the vertical load is applied by the break pin 1, is favorably not more than about 30 mm.

There are optimal values also for a plunging pressure and a plunging amount. When any one of the plunging pressure and the plunging amount is too small or too large, chipping occurs due to the principal of "leverage" and mutual grinding of glass pieces of the LCD panel 3 as have been described above. As a result of consequently carrying out the similar experiment, it was made clear that, while an optimal range for the plunging pressure is about 0.3 MPa to 0.5 MPa, and an optimal range for the plunging amount is about 0.2 mm to 0.5 mm.

As has been described above, in the method of manufacturing the LCD panel 3 of this embodiment, the LCD panel 3 is fixed onto the supporting stage 5 in a state where the LCD panel 3 overhangs the supporting stage 5 by a distance (not more than about 50 mm) which does not cause the LCD panel 3 itself to bend. Then, the scribe lines 2 are formed in the end portion, which overhangs, of the LCD panel 3 respectively from above and below. Thereafter, by use of the break pin 1 formed of or coated with a nonmetallic material, a vertical load is applied to the end portion of the LCD panel 3 in a predetermined position. The predetermined position is at a side of the scribe lines 2, and is closer to the starting points of the respective scribe lines 2, the side being toward the outside.

In the apparatus for cutting the LCD panel 3 of the first embodiment, the LCD panel 3 is fixed to the supporting stage 5 in a state where the LCD panel 3 overhangs the supporting stage 5 by a distance (not more than about 50 mm) which does not cause the LCD panel 3 itself to bend. Then, the scribe lines 2 are formed, with the pair of scribe cutters 14, in the end portion, which overhangs, of the LCD panel 3 both from above and below. Thereafter, by use of the break pin 1 formed of, or coated with, a nonmetallic material, a vertical load is applied to the end portion of the LCD panel 3 in a predetermined position. The predetermined position is at a side of the scribe lines 2, and is closer to the starting points of the respective scribe lines 2, the side closer to the outside.

With any one of these configurations, three factors together have synergistic effect for reducing a load applied to the LCD panel. Specifically, the three factors are: advancing of a cut with the self weight of the LCD panel 3; optimization of forces based on the principal of "leverage" in a state where the scribe lines 2 and the position to which a vertical load is applied are distant from each other; and the scattering of stresses due to the fact that the LCD panel 3 overhangs the supporting stage 5. Thereby, a yield of the LCD panels can be increased by suppressing damages and chipping on the LCD panel 3 to the minimum.

Second Embodiment

Next, a method of cutting an LCD panel and an apparatus for cutting an LCD panel according to a second exemplary embodiment of the present invention will be described with reference to FIGS. 5A to 5C and FIG. 6. Although a load is applied from a vertical direction by using the break pin 1 in the first embodiment, the second embodiment is characterized by applying a load from an oblique direction.

The apparatus for cutting the LCD panel in the second embodiment includes a supporting stage 5, a pair of scribe cutters 14 and a break pin 1. The LCD panel is fixed to the supporting stage 5 by vacuum holding. The scribe cutters 14, as a pair, are respectively arranged in predetermined positions outside a plane of the supporting stage 5. The break pin 1 is arranged in a predetermined position outside the plane of the supporting stage 5. The supporting stage 5 and the pair of scribe cutters 14 are identical to those of the first embodiment.

In the second embodiment, with the break pin 1, a vertical load is applied to the LCD panel 3, on which scribe lines 2 are formed, in a predetermined position at a side of the scribe lines 2 having been formed, the side being toward the outside. Thereby, the entire LCD panel 3 is cut along the scribe lines 2. At this time, the load is applied in an oblique direction by tilting the break pin 1. This is the point different from the first embodiment.

Figure 5A:
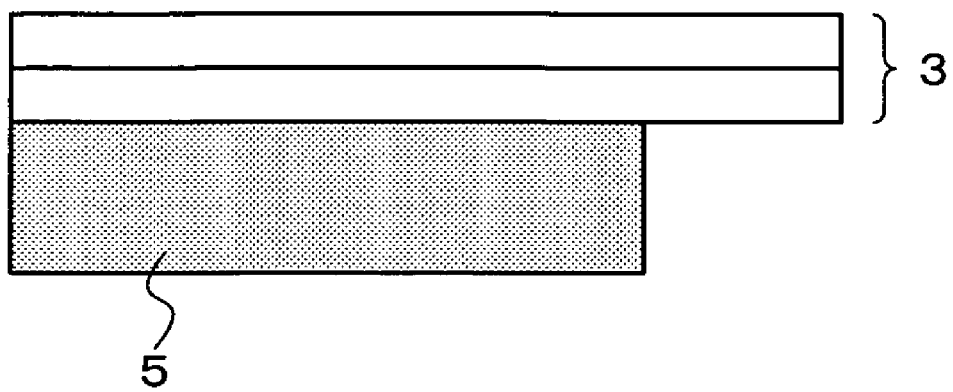
FIGS. 5A to 5C are respectively front views, which follow a sequence of processes, for explaining a cutting method according to a second exemplary embodiment of the invention.

Subsequently, the method of cutting the LCD panel of the second embodiment will be described. First, as in the case with the first embodiment, as shown in FIG. 5A, the LCD panel 3 is fixed to the supporting stage 5 by vacuum holding in a state where the LCD panel 3 overhangs the supporting stage 5 to the extent (not more than about 50 mm) that the LCD panel 3 itself does not bend. When an amount of this overhang is not less than 50 mm, the LCD panel 3 bends downward because of a self weight thereof, and a scribe crack is not perpendicularly advanced, but is obliquely penetrated. For this reason, the LCD panel 3 needs to be overhung by a distance which keeps the LCD panel 3 itself from bending.

Figure 5B:
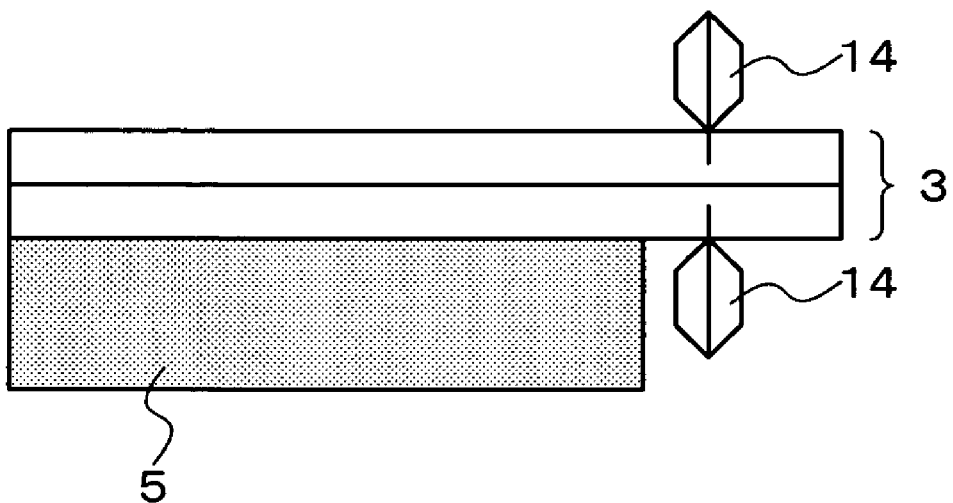

Thereafter, as in the case with the first embodiment, the scribe lines 2 (the broken line in FIG. 6) are formed, as shown in FIG. 5B, respectively in positions on upper and lower surfaces of an end portion of the LCD panel 3, the positions opposite to each other, and the end portion protruding from the supporting stage 5. The scribe lines 2 are formed respectively along previously determined boundary sections of individual LCD panel into which the LCD panel 3 is cut by means of the pair of scribe cutters 14 from above and below. At this time, when each of depths of cuts along the respective scribe lines 2 are not more than 70% of a corresponding one of glass plate thicknesses of the substrates of the LCD panel 3, there may be a case where the cutting fails at the time of breaking. Moreover, when each of depths of cuts are not less than 90% thereof, the LCD panel 3 is cut in various places, and some of uncuttable portions remain as protrusions. For this reason, it is desirable that each of the depths of the respective cuts be about 70% to 90% of a corresponding one of the glass plate thicknesses of the substrates of the LCD panel 3.

Figure 5C:
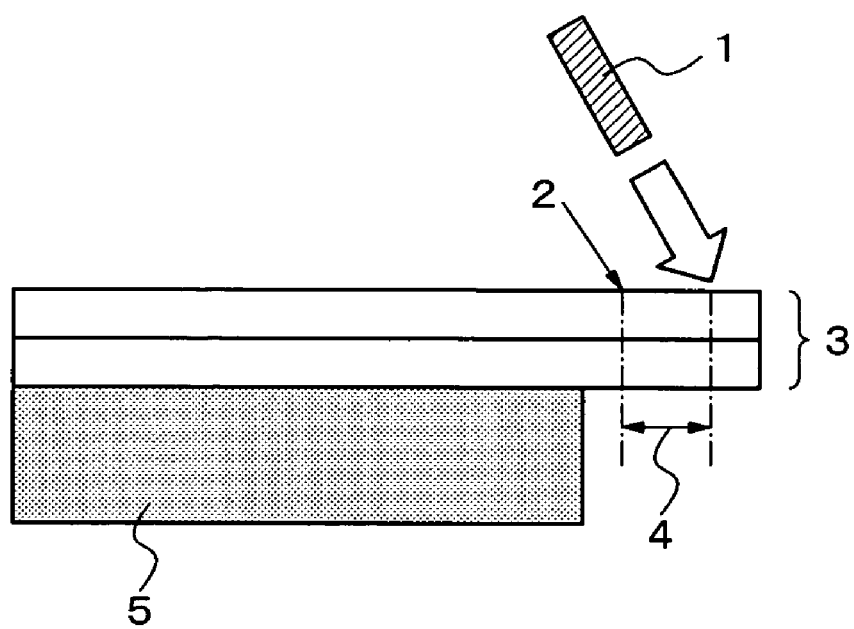
Figure 6:
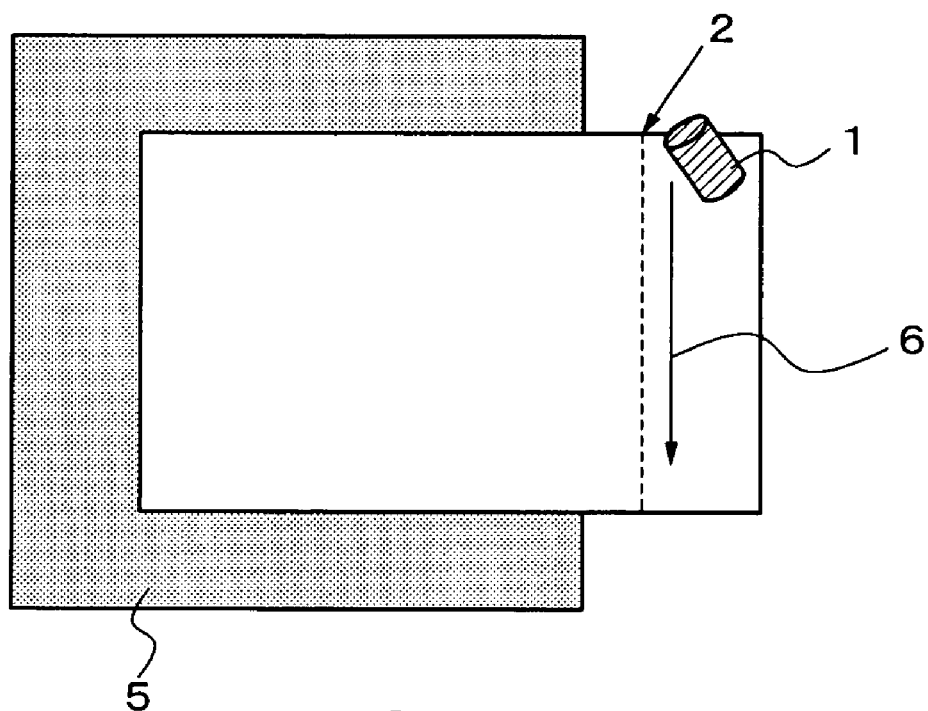
FIG. 6 is a top view schematically showing a cutting apparatus according to the second embodiment of the invention.

Next, as shown in FIG. 5C, a load is applied in an oblique direction by tilting the break pin 1 in the predetermined position at a side of the scribe lines 2, the side being toward the outside. This is the point different from the first embodiment. In this event, in order that a tensile stress works on an outer side of the LCD panel 3, that is, in order that a force is applied in a direction (to the right in FIG. 5C) in which the LCD panel 3 overhangs, an axis (a direction in which the load is applied) of the break pin 1 is tilted in that direction. Additionally, in order that a force is applied in a direction 6 (a downward direction in the drawing) in which the scribing progresses, the axis (the direction in which the load is applied) of the break pin 1 is tilted in that direction. By applying the load from an oblique direction with the break pin 1 thus tilted, it is made possible to carry out the cutting with a small load.

Incidentally, as in the case with the first embodiment, as to a material of the break pin 1, it is preferable that at least, an extremity of the break pin 1 be formed of a nonmetallic material such as polyurethane resin or hard rubber, or that a surface of the break pin 1 be coated with resin or the like, so that flaws and damages are not caused on glasses of the LCD panel 3, and so that generation of static electricity can be suppressed. A shape and dimensions of the break pin 1 are not limited to the descriptions in the drawings. Moreover, it is preferable that the shortest distance between each of the scribe lines 2 and the position to which the load is applied with the break pin 1 be set in a range of about 5 mm to 15 mm, and that the shortest distance between one of edges of the LCD panel 3 at a side of the starting points of the respective scribe lines 2, and the position to which the load is applied with the break pin 1 be set at not more than about 30 mm. With these ranges of the distances, chipping does not occur.

When a direction in which the load is applied to the LCD panel 3 is angled, a vicinity of a place in the LCD panel 3 to which the vertical load is applied is prepared to be cut and to fall. Then, a cut section of the LCD panel 3 is gradually made toward an inside of the LCD panel 3 with the self weight of the LCD panel 3 being added to the cut section. Thereby, the entire LCD panel 3 is cut.

As has been described above, three factors together have synergistic effect for reducing a load applied to the LCD panel 3. Specifically, the three factors are: penetration of a cut with the self weight of the LCD panel 3; optimization of forces based on the principal of "leverage" in a state where the scribe lines 2 and the position to which a vertical load is applied are distant from each other; and the scattering of stresses due to the fact that the LCD panel 3 overhangs the supporting stage 5. Thereby, a yield of the LCD panel can be increased by suppressing damages and chipping on the LCD panel 3 to the minimum.

Furthermore, a tensile stress can be generated by applying the load from an oblique direction by tilting the axis (the direction in which the load is applied) of the break pin 1 in a direction in which the LCD panel overhangs and in the direction 6 in which the scribe lines 2 extends. Thereby, by carrying out the cutting while the LCD panel 3 is pulled, it is made possible to carry out the cutting with a small load. Accordingly, damages and chipping on the LCD panel 3 can be suppressed more as compared to the first embodiment.

Note that, in each of the abovementioned embodiments, a load is applied in a position at a side of the scribe lines 2 toward the outside closer to the starting points of the respective scribe lines 2, the side being towards the outside. However, it is also possible to have a configuration where the load is applied in a position which is at a side of the scribe lines 2 toward the outside, and which is closer to the end points of the respective scribe lines 2. In a case where the load is applied from an oblique direction in this configuration, it suffices that the load be applied to LCD panel 3 by tilting the axis (the direction in which the load is applied) of the break pin 1 in a direction in which the LCD panel overhangs and in a direction opposite to the direction 6 in which the scribing lines 2 extends.

Although the preferred embodiments have been described hereinabove, the present invention is not limited to the above-described embodiments, and various alterations and applications are possible. For example, a case of cutting a pair of glass substrates has been described in the above described embodiments. Meanwhile, a material for the substrates is not limited to glass. Any material would suffice as long as it is one on which chipping occurs at the time when the material is cut. Additionally, a composition of the pair of substrates is not particularly limited to a combination of an active-matrix substrate and a counter substrate. For example, switching elements other than the TFTs may be used. Moreover, the TFTs may be of a regular staggered type (top-gate type), or maybe of a reverse staggered type (bottom-gate type) A color filter used for color display may be formed on the side of the counter substrate, or may be formed on the side of the active-matrix substrate. A drive mode for the LCD device is also arbitrary. The drive mode may be an In-Plane Switching (IPS) mode or a Twisted Nematic (TN) mode. Moreover, alighting method therefor is also not particularly limited. The LCD panel may be of a transmission type, a reflection type or a semi-transmission type. The present invention is not limited to the cutting of glass substrates for an LCD panel, and can be applied to the cutting in general of a pair of substrates bonded to each other.

Although the preferred embodiments of the invention have been described with reference to the drawings, it will be obvious to those skilled in the art that various changes and modifications may be made without departing from the true scope of the invention.

What is claimed is:

1. A method of cutting a pair of substrates comprising the steps of:

fixing the pair of substrates, which have been bonded to each other, to a supporting stage so that an end portion of a predetermined one of edges of the pair of substrates protrudes from the supporting stage and is not supported by any supporting stage;

forming scribe lines respectively in positions on upper and lower surfaces of the end portion of the pair of substrates, the positions opposite to each other, and the end portion protruding from the supporting stage; and applying a load to a predetermined position, which is not supported by any supporting stage at a side of the scribe lines, the position being outside the scribe lines closer to the predetermined edge than to the scribe lines and being closer to starting points of the respective scribe lines than ending portions of the scribe lines, and advancing along the scribe lines.

2. The method of cutting a pair of substrates according to claim 1, wherein the load applied to the substrates is applied from a direction substantially perpendicular to the substrates.

3. The method of cutting a pair of substrates according to claim 2, wherein the pair of substrates is a liquid crystal display panel.

4. The method of cutting a pair of substrates according to claim 1, wherein the load applied to the substrates is applied from a direction oblique to a line substantially perpendicular to the substrates.

5. The method of cutting a pair of substrates according to claim 4, wherein the pair of substrates is a liquid crystal display panel.

6. The method of cutting a pair of substrates according to claim 4, wherein the load applied to the substrates is applied from a direction oblique to a direction toward the predetermined edge, and to a direction in which the scribe lines extend.

7. The method of cutting a pair of substrates according to claim 1, wherein the shortest distance between the scribe lines and the predetermined position is approximately 5 mm to 15 mm.

8. The method of cutting a pair of substrates according to claim 1, wherein the shortest distance between an edge at the side of the starting points of the respective scribe lines on the pair of substrates and the predetermined position is approximately 30 mm or shorter.

9. The method of cutting a pair of substrates according to claim 1, wherein the load applied to the substrates is applied by use of a break pin made of a nonmetallic material.

* * * * *